Figure 1:
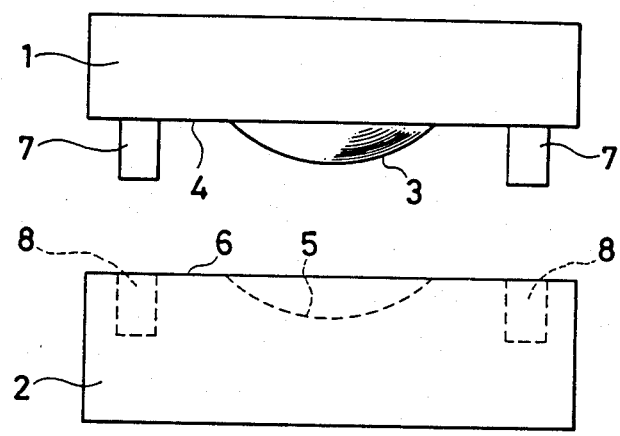

United States Patent [19]

Kohno et al.

[11] Patent Number: 4,761,436
[45] Date of Patent: Aug. 2, 1988

[54] CONTACT LENS COMPRISING TRIORGANOVINYLSILANE POLYMERS

[75] Inventors: Yoshiyuki Kohno, Yokohama; Kenichi Tomita, Tokyo; Minoru Takamizawa, Joetsu; Tetsuya Mayuzumi, Kawagoe; Shigehiro Nagura; Akira Yamamoto, both of Joetsu, all of Japan

[73] Assignee: Shin-Etsu Chemical Co., Ltd., Tokyo, Japan

[21] Appl. No.: 921,107

[22] Filed: Oct. 21, 1986

[30] Foreign Application Priority Data

Oct. 21, 1985 [JP] Japan ............................ 60-235062
Dec. 23, 1985 [JP] Japan ............................ 60-290154

[51] Int. Cl.$^4$ ...................... C08F 289/00; G02C 7/04
[52] U.S. Cl. ............................ 522/114; 351/160 H; 522/116; 522/120; 522/123; 525/288; 264/1.4; 264/2.6
[58] Field of Search ............... 525/288; 522/114, 116, 522/120, 123; 526/279; 264/1.4, 2.6; 351/160 H

[56] References Cited

U.S. PATENT DOCUMENTS 3,841,985 10/1974 O'Driscoll et al. ............... 522/120
3,916,033 10/1975 Merrill .............................. 264/1.4
4,649,185 3/1987 Takamizawa et al. ........... 526/279

FOREIGN PATENT DOCUMENTS 2748568 5/1979 Fed. Rep. of Germany ....... 264/1.4
121874 10/1978 Japan.
49906 3/1985 Japan.
0225115 11/1985 Japan .............................. 526/279
41118 2/1986 Japan.

OTHER PUBLICATIONS

WO 86/01219 PCT, Feb. 27, 1986.

*Primary Examiner*—Wilbert J. Briggs, Sr.
*Attorney, Agent, or Firm*—Oblon, Fisher, Spivak, McClelland & Maier

[57] ABSTRACT

A contact lens comprising a lens substrate in shape of a lens which comprises a triorganovinylsilane based polymer, said lens substrate having a hydrophilic polymeric chain grafted onto the surface thereof. This contact lens is not only excellent in oxygen permeability, mechanical strength, dimensional stability, vision correcting ability, staining resistance and handleability, but also good in affinity with eyes due to good hydrophilic property possessed by the surface, which can be worn continuously for a long time.

13 Claims, 1 Drawing Sheet

CONTACT LENS COMPRISING TRIORGANOVINYLSILANE POLYMERS

This invention relates to a contact lens and a method for preparation thereof, particularly to a contact lens of which surface has good and stable hydrophilic property and a method for preparing the same.

In the prior art, as one of contact lenses, a hard contact lens comprising a hard material such as polymethyl methacrylate is known, but this involves the drawbacks such that metabolic function of cornea may be damaged due to extremely small oxygen permeability of the material, that there is a feeling of a foreign matter when worn due to poor affinity with eyes because it is rigid and hydrophobic on the surface, etc. As a soft contact lens comprising a soft material, for example, a hydrous gel type contact lens comprising poly-2-hydroxyethyl methacrylate and a non-hydrous elastomer type contact lens comprising silicone rubber, etc., is known. The soft contact lens of the hydrous type has drawbacks such as poor dimensional stability, mechanical strength and vision correcting ability; insufficient oxygen permeability; susceptibility to staining with tear fluid components, and also cumbersome handling such as disinfection treatment. On the other hand, the soft contact lens of the non-hydrous elastomer type has drawbacks such as insufficient oxygen permeability, poor workability and susceptibility to staining.

In contrast, a contact lens comprising poly(trialkylvinylsilane) is known to have advantages that it has good oxygen permeability, dimensional stability, vision correcting ability, transparency, staining resistance, mechanical strength and workability, that it can be handled easily and also that it will hardly damage cornea (Japanese Laid-open Patent Publication No. 225115/1985). However, the surface of the contact lens comprising poly(trialkylvinylsilane) is hydrophobic and poor in affinity with eyes, and therefore a feeling of a foreign matter remains when worn on the eyes, whereby it is difficult to use continuously for a long term.

Accordingly, it has been proposed to make hydrophilic the surface of the contact lens comprising poly(trialkylvinylsilane) to the depth of several microns from the surface by treatment of the surface with a low temperature plasma (Japanese Laid-open Patent Publication No. 27436/1978). According to this method, although the surface of the lens can be made favorably hydrophilic, the hydrophilic property obtained lacks permanence. Particularly, it will be lost within a short time in dry air, whereby the surface will return to the original hydrophobic state.

Accordingly, an object of the present invention is to provide a contact lens which is not only excellent in oxygen permeability, mechanical strength, dimensional stability, vision correcting ability, staining resistance and handleability, but also good in affinity with eyes due to good hydrophilic property possessed by the surface, which can be worn continuously for a long time.

The present invention provides a contact lens comprising a lens substrate in shape of a contact lens which comprises a triorganovinylsilane based polymer, said lens substrate having a hydrophilic polymeric chain grafted onto the surface thereof.

The contact lens of the present invention has good oxygen permeability, mechanical strength, dimensional stability, vision correcting ability, staining resistance, handleability, as well as good affinity with eyes due to good hydrophilic property possessed by its surface. Therefore it can be worn continuously for a long time.

Figure 2:
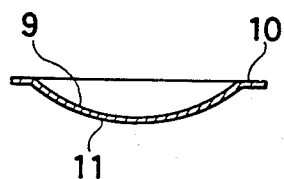

In the accompanying drawings,

FIG. 1 is a front view showing the dies to be used for heating pressurization molding of a lens material, and FIG. 2 is a longitudinal sectional view of the molded product molded with said dies.

The triorganovinylsilane based polymer used in the present invention is a polymer comprising triorganovinylsilane as a main monomer, and a preferable example is a polymer containing a poly(triorganovinylsilane) chain represented by the formula (I):

wherein $R^1$, $R^2$ and $R^3$, which may be either identical or different, each represent an alkyl group having 1 to 6 carbon atoms or a phenyl group, and n is an integer of at least 600, as the main structure.

In the above formula (I), examples of $R^1$, $R^2$ and $R^3$ may include $C_1$-$C_6$ alkyl groups such as methyl, ethyl, propyl, butyl and the like and phenyl group. n is an integer of at least 600, preferably an integer of 4,000 or more.

As the above preferable triorganovinylsilane based polymer, for example, there may be included poly(triorganovinylsilane) consisting of the structure represented by the formula (I) and a block copolymer of the poly(triorganovinylsilane) chain represented by the formula (I) and another polymer chain. Examples of other polymer chains for forming the block copolymer may include polystyrene, polyisoprene, polydimethylsiloxane, etc.

If the triorganovinylsilane based polymer used in the present invention is a block copolymer as described above, the proportion of the poly(triorganovinylsilane) structure of the formula (I) in the copolymer should be preferably 50 wt. % or more, more preferably 70 wt. % or more. If the proportion is less than 50 wt. %, oxygen permeability, dimensional stability and staining resistance of the lens substrate will be poor.

The above triorganovinylsilane based polymer should preferably have a molecular weight of 100,000 or more, particularly 300,000 or more. If the molecular weight is too small, the mechanical strength of the molded product obtained is lowered, whereby it becomes difficult to apply precise mechanical working.

The above triorganovinylsilane based polymer can be prepared by anion polymerization of a triorganovinylsilane represented by the formula (II):

wherein $R^1$, $R^2$ and $R^3$ are as defined above, with addition of n-butyl lithium or the like as a catalyst at a temperature around 20° to 70° C. in an inert gas atmosphere for 20 to 50 hours, to give a poly(triorganovinylsilane) comprising the structure of the formula (I). If desired, by permitting the polymer chain thus obtained to copolymerize with another comonomer such as styrene, isoprene, hexamethylcyclotrisiloxane, etc., a block polymer can be obtained.

Another preferable example of the triorganovinylsilane based polymer used in the present invention is a copolymer comprising 99.99 to 99.50 mol % of a triorganovinylsilane of the above formula (II) and 0.01 to 0.5 mol % of a diorganodivinylsilane represented by the formula (III):

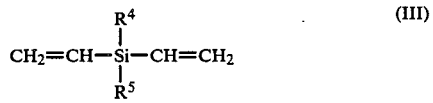

$$CH_2=CH-\underset{\underset{R^5}{|}}{\overset{\overset{R^4}{|}}{Si}}-CH=CH_2 \qquad (III)$$

wherein $R^4$ and $R^5$, which may be either identical or different, each represent an alkyl group having 1 to 6 carbon atoms or phenyl group.

Although a homopolymer of the triorganovinylsilane of the formula (II) with a polymerization degree of 5,000 or more can be prepared with difficulty, the above copolymer can be prepared by the anion polymerization as described above to have a polymerization degree of 5,000 or more with ease, even about 15,000 depending on the condition. That is, copolymers having molecular weights of 500,000 or more can be prepared easily, and the mechanical strength of the lens can be further improved by the increase of the molecular weight.

The diorganodivinylsilane of the formula (III) used in the preparation of the above copolymer according to anion polymerization may be added to triorganovinylsilane before initiation of polymerization, or alternatively in the course of polymerization. The amount of this monomer formulated should preferably be 0.5 mol % or less of the total monomers, since, if it is excessive, the polymer becomes insoluble in organic solvents and can be molded with difficulty. On the other hand, in order to make the polymerization degree of the desired polymer 5,000 or higher, it is required to be added in an amount of 0.01 mol % based on the total monomers.

Preferable examples of the triorganovinylsilane of the formula (II) to be used in the above preparation methods may include trimethylvinylsilane, dimethylpropylvinylsilane, dimethylethylvinylsilane, methyldiethylvinylsilane, dimethylphenylvinylsilane and the like, and these can be used singly or in combination.

Examples of the diorganodivinylsilane of the formula (III) include dimethyldivinylsilane, diethyldivinylsilane, and the like.

Oxygen permeability and softening point of the molded product of a triorganovinylsilane based polymer will differ depending on the kinds of $R^1$, $R^2$ and $R^3$ in the formula (II). For example, coefficients of oxygen permeability are large as $4.5 \times 10^{-9}$ for poly(trimethylvinylsilane), $2.5 \times 10^{-9}$ for poly(dimethylethylvinylsilane) and $1.8 \times 10^{-9}$ for poly(dimethyl n-propylvinylsilane) (units are all $cm^3(STP) \cdot cm/cm^2 \cdot sec \cdot cmHg$), but they differ depending on $R^1$, $R^2$ and $R^3$. Accordingly, by selecting one or more kinds of the monomers used for polymerization, coefficient of oxygen permeability and softening point of the contact lens obtained can be controlled. Also, if the triorganovinylsilane based polymer is a block copolymer of the poly(triorganovinylsilane) structure of the formula (I) and another polymer chain, oxygen permeability and softening point can be controlled by the kind and the content of another polymer chain.

For preparation of a lens substrate in shape of a desired contact lens comprising a triorganovinylsilane based polymer, various methods as described below can be utilized.

The contact lens of the present invention comprises hydrophilic polymer chains grafted onto the surface of such a lens substrate.

Formation of hydrophilic polymer chains grafted onto the surface of the lens substrate can be practiced preferably by graft polymerization of a hydrophilic monomer compound onto the surface of the lens substrate according to plasma graft polymerization or photo-graft polymerization.

The hydrophilic monomer compounds which can be used include methacrylic acid; acrylic acid; n-vinylpyrrolidone; acrylamide; hydroxyalkyl methacrylate and hydroxyalkyl acrylate such as 2-hydroxyethyl methacrylate, 2-hydroxypropyl methacrylate, 2-hydroxyethyl acrylate, 2-hydroxypropyl acrylate and the like; olefin glycol monomethacrylate such as diethylene glycol monomethacrylate, triethylene glycol monomethacrylate, tetraethylene glycol monomethacrylate, propylene glycol monomethacrylate, decaethylene glycol monomethacrylate and corresponding acrylates; methoxyolefin glycol methacrylate such as methoxyethylene glycol methacrylate, methoxytriethylene glycol methacrylate, methoxytetraethylene glycol methacrylate, methoxypropylene glycol methacrylate and methoxypolyethylene glycol methacrylate and corresponding acrylates; 2-dimethyl aminoethyl methacrylate; piperidinoethyl methacrylate; and 2-butyl aminoalkyl methacrylate, etc.

The method utilizing plasma graft polymerization is a method comprising the steps of:

subjecting the surface of a lens substrate comprising a triorganovinylsilane based polymer to treatment with a low temperature gas plasma, subsequently exposing said surface to oxygen (usually, air is satisfactory), thereby introducing peroxide groups into said surface, and then dipping said lens substrate in a solution containing one or more kinds of hydrophilic monomer compounds to thereby graft polymerizing said monomer compounds onto the surface of the lens substrate by redox polymerization or thermal polymerization.

In this method, as the gas to be used for generation of low temperature gas plasma, there may be included argon gas, helium gas, nitrogen gas, oxygen gas, ammonia gas, etc., or mixed gases of these. Plasma is generated by glow discharge under a gas pressure in the system of 0.2 to 20 mmHg or by corona discharge under a gas pressure in the system of 150 mmHg to normal pressure, and treatment is performed for 5 seconds to 20 minutes, preferably 15 seconds to 5 minutes.

The above mentioned redox polymerization is carried out in the presence of a catalyst such as $Fe^{3+}$, hydroxylamine and hydrazine, and the thermal polymerization is carried out at a temperature of 50° to 120° C.

The method utilizing photo-graft polymerization can be carried out by exposing the lens substrate to the vapor of one or more kinds of hydrophilic monomer compounds or a solution containing these monomer compounds in the presence of a suitable photosensitizer such as benzophenone, anthraquinone, benzoyl peroxide and the like under irradiation of light with wavelength of about 250 to 500 nm by use of, for example, a high pressure or low pressure mercury lamp, whereby said monomer compounds are graft-polymerized onto the surface of the lens substrate.

The lens substrate to be used for having hydrophilic polymeric chains grafted onto the surface thereof is a thin circular plastic article with opposed concave and convex surfaces for the lens, having entirely the same shape as the final product except for having no hydrophilic polymeric chain grafted thereon.

The method for preparation of the lens substrate is not particularly limited, and it can be prepared similarly as in preparation of conventional contact lenses, by cutting a film-shaped molding or a button-shaped molding prepared from the polymeric material as described above into shape of a lens, followed by polishing. However, this method is not an efficient method, because working operations are cumbersome. In this respect, the following preparation method provided by the present inventors is capable of preparing a lens substrate with ease and good efficiency.

This method for preparation of a lens substrate comprises the steps of:

molding said triorganovinylsilane based polymer into a film, and molding the film-shaped molded product obtained between a convex die and a concave die by heating under pressurization.

For molding of the starting polymer into a sheet, ordinarily a solution of the polymer dissolved in a suitable solvent such as toluene, xylene, cyclohexane, tetrahydrofuran may be casted on a smooth flat surface, followed by evaporation of the solvent. Alternatively, the starting polymer in shape of powder or pellets may be molded into a sheet by heating at about 180° to 340° C. according to, for example, the extrusion molding method. The thickness of the sheet is not limited, but it is generally 0.1 to 1.0 mm, preferably 0.1 to 0.4 mm. The film should preferably be made smooth on at least one surface thereof.

Next, the substrate is cut into a circular piece having a diameter greater by at least 3 mm than the contact lens diameter, which is then formed into a contact lens substrate by heating under pressurization between the dies. The dies are required to be comprised of a convex type mold having the radius of curvature corresponding to the concave surface of the desired contact lens and a concave type mold. The dies may also preferably be plated with chromium or nickel, whereby not only durability and damage resistance of the dies can be improved, but also the state of surface finishing of the contact lens obtained can be made more smooth. Molding by use of these dies should be preferably performed at a temperature within the range of from 110° to 270° C. which is the range of the softening point of the film or higher and its melt flow temperature or lower, because an optical strain may be generated in the molded product at a temperature lower than 110° C. and oxidative deterioration, thermal decomposition, etc., may be caused to occur in the molded polymer at a temperature above 270° C. Molding should be practiced under a pressure of 1 to 300 kg/cm$^2$, because only insufficient molding can be effected under a pressure of less than 1 kg/cm$^2$, whereby there is the fear that the concave surface of the molded product obtained may not become a concave surface having a desired radius of curvature.

The above mentioned film piece is molded into a molded product having a concave surface portion with a diameter larger than that of the desired contact lens according to the heating pressurization molding by use of the dies, and the molded product is further finished to a lens substrate with the same shape as the desired contact lens by cutting and polishing the convex surface and the edge portion thereof. That is, the above molded product is held on a supporting stand having a curved surface coincident with the concave surface of the molded product and then subjected to cutting and polishing. It is required that the optical axis of the concave surface and the optical axis of the convex surface of the contact lens obtained should be coincident with each other. For making setting of the optical axes easier, the above molded product should desirably be molded so as to have a flat portion which forms a flat plane perpendicular to the optical axis of its concave surface at the outer circumference portion or so as to have a cylindrical peripheral portion having the same center axis as the optical axis of its concave surface at the outer circumference portion. By using the above mentioned flat portion or the cylindrical peripheral portion as a guide, deviation between the molded product and the supporting stand can be made minimum, whereby the center axis can be set correctly in the subsequent cutting and polishing steps to enable production of a contact lens with the coincident optical axes of the opposed concave and convex surface of the contact lens with good efficiency. If desired, the concave surface of the molded product may be also polished.

Further, in the above method for preparation of a lens substrate, before heating and pressurization molding of the above film-shaped molded product, it should preferably be stretched biaxially at a temperature of 90 to 170° C., whereby the mechanical strengths such as tensile strength, flexural strength, impact strength, etc., of the contact lens obtained can be markedly improved. This stretching may be practiced by means of a conventional device. The temperature for performing stretching may be preferably within the range of from 140° to 170° C. in the case where $R^1$, $R^2$ and $R^3$ in the formula (II) representing the triorganovinylsilane are all alkyl groups, because the thermal softening temperature of this polymer is 130° C. to 160° C. and the melt flow temperature is 230° C. to 330° C. On the other hand, it should preferably be within the range of from 90° to 120° C. in the case where $R^1$, $R^2$ and $R^3$ contain phenyl group, because the thermal softening point of this polymer is 85° to 115° C. and the melt flow temperature is 200° C. to 300° C. At a temperature lower than these temperature ranges, stretching cannot be effected because the polymer cannot be sufficiently softened, while at a temperature higher than the temperature ranges, strength-imparting effect cannot be sufficiently exhibited even if stretching is performed.

Heating for stretching of the above film-shaped molded product should preferably be conducted in an inert gas or a polyethylene glycol bath, for instance. It is not preferable to heat the film in air for several hours, because the polymer may be caused to undergo lowering in polymerization degree.

The stretching degree may be preferably from 2 to 5 in area ratio. If the stretching degree is less than 2, the strength-imparting effect cannot be exhibited sufficiently. If the stretching degree is greater than 5, the shape stability and scratch resistance of the contact lens obtained may become poor.

It is also preferable to carry out the secondary heating treatment at 100° to 170° C. of the film after stretching in order to enhance the shape stability of the molded product.

EXAMPLES

The present invention will now be described in more detail with reference to examples.

EXAMPLE 1

To 50 g of purified trimethylvinylsilane, 0.1 g of 15% n-butyl lithium solution in hexane was added and anion polymerization was carried out at 60° C. for 24 hours under anhydrous condition in a nitrogen gas atmosphere. The polymer formed was purified by precipitation in a mixture of cyclohexane and methanol and dried to give 45 g of a polytrimethylvinylsilane.

A 5 wt. % solution of this polymer in cyclohexane was casted into a mold and then the solvent was evaporated to give a transparent film. The film was then cut and polished to prepare a lens substrate.

Subsequently, this lens substrate was placed in a plasma tube and subjected to helium plasma treatment for 20 sec., in which the plasma was generated by glow-discharging under the conditions of 0.6 Torr and an applied power of 128 Watt while passing helium gas.

After the treated lens substrate was taken out in the air to form a peroxide on the surface, it was dipped into a n-vinylpyrrolidone monomer solution and a hydrophilic polymer chain was grafted onto the lens surface by thermal polymerization at 80° C. for 8 hours. The thus obtained contact lens was found to be sufficiently wetted with water. The contact angle between the film of the same material treated similarly and water was found to be 40°. Thus, hydrophilic property was dramatically improved as compared with the contact angle of 113° before treatment. This hydrophilic property did not substantially change with lapse of time.

When ATR-IR spectrum of the above film was measured, an absorption band of the carbonyl group due to poly N-vinylpyrrolidone was confirmed at 1600–1700 $cm^{-1}$.

Also, after the above film was dipped in an aqueous bovine serum albumin solution in a concentration of 50 mg/dl for 1 hour, it was subjected to measurement of ATR-IR spectrum. However, substantially no absorption band at 1655 $cm^{-1}$ due to the amide 1 of bovine serum albumin was observed. As the result, it was found that the above contact lens was extremely excellent in staining resistance.

EXAMPLE 2

A lens substrate prepared in the same manner as in Example 1 was placed in a plasma tube and subjected to argon plasma treatment for 20 sec., in which the plasma was generated by corona-discharging under normal pressure while passing argon gas.

After the treated lens substrate was taken out in the air to form a peroxide on the surface, it was dipped into a solution containing n-vinylpyrrolidone monomer and methoxypolyethylene glycol monomer having a molecular weight of 2,080 in a weight ratio of 3/1 and a hydrophilic polymer chain was grafted onto the lens surface by thermal polymerization at 80° C. for 8 hours. The thus obtained contact lens was found to be sufficiently wetted with water. The contact angle between the film of the same material treated similarly and water was found to be 50°, and it did not substantially change with lapse of time.

After the above film was dipped in an aqueous bovine serum albumin solution in a concentration of 50 mg/dl for 1 hour and then subjected to measurement of ATR-IR spectrum. However, substantially no absorption band at 1655 $cm^{-1}$ due to the amide 1 of bovine serum albumin was observed. As the result, it was found that the above contact lens was extremely excellent in staining resistance.

EXAMPLE 3

After benzoyl peroxide was fixed on a lens substrate which was prepared in the same manner as in Example 1, the lens substrate was placed in a quartz tube and irradiated with light of a high pressure mercury lamp in the presence of n-vinylpyrrolidone monomer under $5 \times 10^{-2}$ Torr at 60° C. for 1 hour. The thus obtained contact lens was found to be sufficiently wetted with water. The contact angle between the film of the same material treated similarly and water was found to be 40° and it did not substantially change with lapse of time.

When ATR-IR spectrum of the above film was measured, an absorption band of the carbonyl group due to poly N-vinylpyrrolidone was confirmed at 1600–1700 $cm^{-1}$.

After the above film was dipped in an aqueous bovine serum albumin solution in a concentration of 50 mg/dl for 1 hour and then subjected to measurement of ATR-IR spectrum. However, substantially no absorption band at 1655 $cm^{-1}$ due to the amide 1 of bovine serum albumin was observed. As the result, it was found that the above contact lens was extremely excellent in staining resistance.

EXAMPLE 4

To 50 g of trimethylvinylsilane, 0.039 ml of 15% n-butyl lithium solution in hexane was added and anion polymerization was carried out at 50° C. for 48 hours under anhydrous condition in a nitrogen gas atmosphere. The polymer formed was dissolved in 500 ml of cyclohexane, purified by precipitation in excessive methanol and dried to give 45 g of a polytrimethylvinylsilane. The molecular weight of the polymer obtained was measured by gel permeation chromatography (column: A-80M, produced by Showa Denko K.K.) to find that the weight average molecular weight calculated in terms of polystyrene was about 500,000. Then, the polytrimethylvinylsilane was dissolved in cyclohexane to prepare a 25 wt. % solution and a film with a thickness of 0.5 mm was prepared according to the casting method. This film was cut into a circular piece with a diameter of 20 mm, and this was subjected to heating molding under pressurization by means of the dies shown in FIG. 1 of the accompanying drawing at 130° C. under a pressure of 10 kg/cm² for 30 sec. The dies shown in FIG. 1 comprise a convex die 1 and a concave die 2. The convex die 1 has a convex surface 3 with a radius of curvature of 7.50 mm, with its peripheral portion being a flat portion 4 which forms a flat plain perpendicular to the center axis of said convex surface. The concave die 2 has a concave surface 5 with a radius of curvature of 8.00 mm, with its peripheral portion being a flat portion 6 which forms a flat plane perpendicular to the center axis of said concave surface 5. The convex die 1 is provided with projections 7 for guide, and the concave die 2 is provided with holes 8 capable of receiving the projections 7. By the above heating molding under pressurization, a molded product having a shape, of which sectional view is shown in FIG. 2, was obtained. The concave surface 9 of this molded product has the same radius of curvature as that of the concave surface of the desired contact lens but its diameter is slightly larger than that of the contact lens. The peripheral portion 10 of the molded product forms a flat flange which is perpendicular to the optical axis of said concave surface 9. By cutting and polishing the convex surface 11 and the edge portion of this molded product into desired shapes, a lens substrate with a diameter of 8.8 mm and a power of −3.50 was obtained.

Subsequently, this lens substrate was placed in a plasma tube and subjected to helium plasma treatment for 20 seconds, in which the plasma was generated by glow discharge under the conditions of 0.6 Torr and an applied power of 128 Watt while helium gas was passed.

After the treated lens substrate was taken out in the air to form a peroxide on the surface, it was dipped into a n-vinylpyrrolidone monomer solution and a hydrophilic polymer chain was grafted onto the lens surface by thermal polymerization at 80° C. for 8 hours. The thus obtained contact lens was found to be sufficiently wetted with water. The contact angle between the film of the same material treated similarly and water was found to be 40°. Thus, hydrophilic property was dramatically improved as compared with the contact angle of 113° before treatment. Also, this hydrophilic property did not substantially change with lapse of time.

When ATR-IR spectrum of the above film was measured, an absorption band of the carbonyl group due to poly N-vinylpyrrolidone was confirmed at 1600–1700 $cm^{-1}$.

After the above film was dipped in an aqueous bovine serum albumin solution in a concentration of 50 mg/dl for 1 hour, and it was subjected to measurement of ATR-IR spectrum. However, substantially no absorption band at 1655 $cm^{-1}$ due to the amide 1 of bovine serum albumin was observed. As the result, it was found that the above contact lens was extremely excellent in staining resistance.

From the steps described above, a contact lens having a convex surface with a radius of curvature of 7.50 mm, a diameter of 8.8 mm and a power of −3.50 was obtained. This contact lens was found to have a specific gravity at 25° C. of 0.884 and a coefficient of oxygen permeability in physiological saline of $2.5 \times 10^{-9}$ $cm^3(STP)\cdot cm/cm^2\cdot sec\cdot cmHg$.

EXAMPLE 5

To a mixture of 100 g of trimethylvinylsilane and 0.22 g (0.20 mol %) of dimethyldivinylsilane was added 0.078 ml of 15% n-butyl lithium solution in hexane and anion polymerization was carried out at 50° C. for 48 hours under anhydrous condition in a nitrogen gas atmosphere. The polymer formed was dissolved in 1 liter of tetrahydrofuran, precipitated in excessive acetone, purified and dried to obtain 91 g of a polytrimethylvinylsilane. This polymer was found to have a weight average molecular weight of 1,500,000.

Subsequently, the polymer obtained was dissolved in cyclohexane to give a 25 wt. % solution, from which a film with a thickness of 1.5 mm was prepared according to the casting method, and then the film was subjected to simultaneous biaxial stretching in a polyethylene glycol bath under heating at 150° C. to an area ratio of 3.0-fold, whereby a transparent stretched film with a film thickness of 0.5 mm was obtained.

Next, the stretched film was heat-molded under pressurization by means of the same dies as in Example 4 under the same conditions, followed by cutting and polishing to obtain a lens substrate. Further, according to the same method as in Example 4, the surface hydrophilic modification treatment was conducted to obtain a contact lens with good water wettability. This contact lens was found to have a concave face with a radius of curvature of 7.50 mm, a diameter of 8.8 mm and a power of −3.50.

This contact lens was found to have a specific gravity at 25° C. of 0.884 and a coefficient of oxygen permeability in physiological saline of $2.5 \times 10^{-9}$ $cm^3(STP)\cdot cm/cm^2\cdot sec\cdot cmHg$.

EXAMPLE 6

To 50 g of dimethylethylvinylsilane, 0.1 ml of 15% n-butyl lithium solution in hexane was added and anion polymerization was carried out at 60° C. for 24 hours under anhydrous condition in a nitrogen gas atmosphere. The polymer formed was dissolved in 500 ml of cyclohexane, purified by precipitation in excessive methanol and dried to give 43 g of a polydimethylethylvinylsilane with a molecular weight of 350,000 calculated in terms of polystyrene. Then, the polydimethylethylvinylsilane was dissolved in toluene to prepare a 15 wt. % solution. The solution was filtered, casted on a glass plate and dried to form a film with a thickness of 0.2 mm.

By use of the film thus obtained, a lens substrate was prepared and treated in the same manner as in Example 4 to obtain a contact lens having a diameter of 9.0 mm.

The contact lens obtained showed no optical strain but good hydrophilic property, vision correcting ability and staining resistance, and the hydrophilic property did not substantially change with lapse of time.

We claim:

1. A contact lens comprising a lens substrate in the shape of a lens which comprises a triorganovinylsilane based polymer having a molecular weight of at least 100,000, said lens substrate having a hydrophilic polymeric chain grafted onto the surface thereof.

2. A contact lens according to claim 1, wherein the triorganovinylsilane based polymer contains poly(triorganovinylsilane) chain represented by the formula (I):

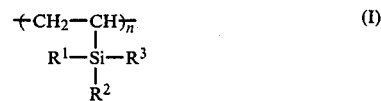

wherein $R^1$, $R^2$ and $R^3$, which may be either identical or different, each represent an alkyl group having 1 to 6 carbon atoms or phenyl group, and n is an integer of at least 600, as the main structure.

3. A contact lens according to claim 2, wherein $R^1$ and $R^2$ are methyl group, and $R^3$ is methyl or ethyl group.

4. A contact lens according to claim 2, wherein said triorganovinylsilane based polymer is a poly(triorganovinylsilane).

5. A contact lens according to claim 1, wherein said triorganovinylsilane based polymer is a copolymer comprising 99.99 to 99.50 mol % of a triorganovinylsilane represented by the formula (II):

wherein $R^1$, $R^2$ and $R^3$ are as defined above, and 0.01 to 0.5 mol % of a diorganodivinylsilane represented by the formula (III):

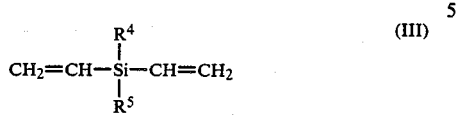
(III)

wherein $R^4$ and $R^5$, which may be either identical or different, each represent an alkyl group having 1 to 6 carbon atoms or phenyl group.

6. A contact lens according to claim 5, wherein said copolymer has a polymerization degree of at least 5,000.

7. A contact lens according to claim 1, wherein said lens substrate is prepared according to a method comprising the steps of:
   molding said triorganovinylsilane based polymer into a film, and
   molding the film-shaped molded product obtained between a convex die and a concave die by heating under pressurization.

8. A contact lens according to claim 7, wherein said method comprises obtaining a molded product having a concave surface with the same radius of curvature as the concave surface of the desired contact lens in said molding step by heating under pressurization, and further having the step of cutting and polishing the concave surface and the edge portion of said molded product.

9. A contact lens according to claim 7, wherein said method comprises the step of stretching said film-shaped molded product diaxially at a temperature of 90° to 170° C. prior to molding by heating under pressurization.

10. A contact lens according to claim 1, wherein said hydrophilic polymeric chain grafted onto the surface of the lens substrate is formed by a method comprising the steps of:
   subjecting the surface of said lens substrate to treatment with a low temperature gas plasma,
   subsequently exposing said surface to oxygen thereby introducing peroxide groups into said surface,
   and then dipping said lens substrate in a solution containing one or more kinds of hydrophilic monomer compounds to thereby graft polymerizing said monomer compounds onto the surface of the lens substrate by redox polymerization or thermal polymerization.

11. A contact lens according to claim 10, wherein said hydrophilic monomer compound is selected from the group consisting of methacrylic acid, acrylic acid, n-vinylpyrrolidone, acrylic acid amide, hydroxyalkl methacrylate, hydroxyalkyl acrylate, olefin glycol monomethacrylate, olefin glycol monoacrylate, methoxyolefin glycol methacrylate, methoxyolefin glycol acrylate, 2-dimethylaminoethyl methacrylate, piperidinoethyl methacrylate and 2-butylaminoalkyl methacrylate.

12. A contact lens according to claim 1, wherein said hydrophilic polymeric chain grafted onto the surface of the lens substrate is formed by a method comprising the step of:
   exposing the lens substrate to the vapor of one or more kinds of hydrophilic monomer compounds or a solution containing these monomer compounds in the presence of a suitable photosensitizer under irradiation of light with wavelength of about 250 to 500 nm, whereby said monomer compounds are graft-polymerized onto the surface of the lens substrate.

13. A contact lens according to claim 12, wherein said hydrophilic monomer compound is selected from the group consisting of methacrylic acid, acrylic acid, n-vinylpyrrolidone, acrylic acid amide, hydroxylkyl methacrylate, hydroxyalkyl acrylate, olefin glycol monomethacrylate, olefin glycol monoacrylate, methoxyolefin glycol methacrylate, methoxyolafin glycol acrylate, 2-dimethylaminoethyl methacrylate, piperidinoethyl methacrylate and 2-butylaminoalkyl methacrylate.

* * * * *